United States Patent

Massenz

[11] 3,910,618
[45] Oct. 7, 1975

[54] CONTACT LENS APPLICATOR
[76] Inventor: Enrico Massenz, 8807 First Ave., North Bergen, N.J. 07047
[22] Filed: Dec. 12, 1974
[21] Appl. No.: 532,173

[52] U.S. Cl. ............ 294/1 CA; 128/249; 128/303 R
[51] Int. Cl.² .................................................. A61F 9/00
[58] Field of Search ............... 294/1 R, 1 CA, 64 R; 128/1 R, 20, 233, 249, 303 R; 206/5.1; 351/40, 160

[56] References Cited
UNITED STATES PATENTS
| | | | |
|---|---|---|---|
| 2,482,431 | 9/1949 | Okawa | 128/233 |
| 2,919,696 | 1/1960 | Rinaldy | 294/1 CA UX |
| 3,054,398 | 9/1962 | Kobler | 351/160 X |
| 3,411,364 | 11/1968 | Horley et al. | 294/1 CA X |

Primary Examiner—Richard A. Schacher
Assistant Examiner—Johnny D. Cherry
Attorney, Agent, or Firm—Popper & Bobis

[57] ABSTRACT

A contact lens applicator that provides a deformable, resilient transparent, cup, the edge of which when compressed and applied to tissues surrounding the eye, spreads them, so that the eye is widely exposed for the application of a contact lens, and the cup of which is transparent so that the user, with the aid of a mirror can exactly guide the lens to exact seating on the iris.

7 Claims, 6 Drawing Figures

CONTACT LENS APPLICATOR

BACKGROUND OF INVENTION

1. Field of Invention

This invention relates generally to contact lens applicators and specifically to contact lens applicators which are transparent, resilient and deformable, so as to enable them to distend the tissues around the eye to widely expose it for application of a contact lens.

2. Prior Art

Contact lens applicators are well known. They are frequently provided with rigid cups, which are opaque (U.S. Pat. No. 2,919,696) which are to be manipulated to retract the skin around the eye. This is a difficult task. The opacity of the cup makes it difficult for the user to direct the contact lens to the proper position in the eye. Other contact lens applicators concern themselves with holding the lens on a seat prior to application (U.S. Pat. No. 3,129,971). This results in a cumbersome construction which is difficult to operate, and not necessary, since the maintenance of the lens on a seat prior to application is a modest skill, easy to attain.

SUMMARY OF INVENTION

It has been found that a deformable, resilient, transparent, eyecup can be prepared that can have its cup orifice compressed, before being applied to the fleshy margins of the eyeball. Upon application of the cup orifice, in a compressed state, to the eye lid and to the flesh below the eye, the cup is released and resumes its normal shape, and in so doing, opens the eye wide, pressing the eyelid wide open, and the flesh below the eye far down, thereby fully exposing the eyeball. This fully exposes the iris of the eye for application of the contact lens. In addition, the transparent cup permits the user to sight the position of a lens seat in a mirror, through the transparent cup, and thus aim the lens seat at the iris of the eye, and move it to seat the contact lens precisely, thereby, eliminating the need to further adjust the position of the lens in contact with the eyeball, which action may be both difficult and irritating.

THE DRAWINGS

These objects and advantages as well as other objects and advantages may be attained by the device shown by way of illustration in the drawings in which.

PREFERRED EMBODIMENT

Figure 1:
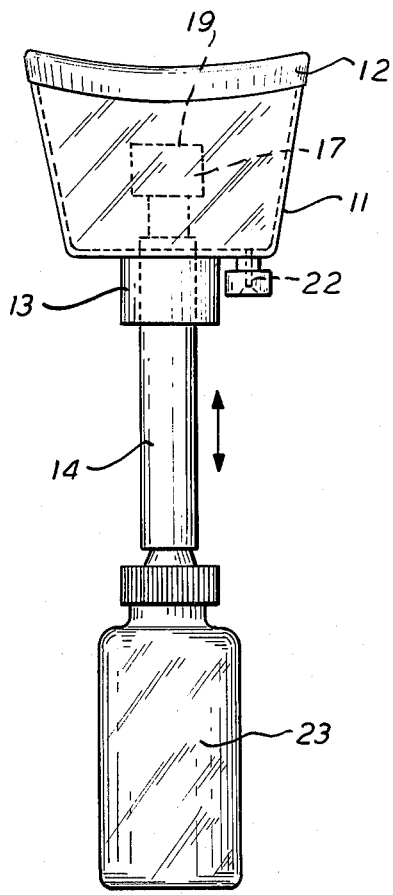
FIG. 1 is a side elevational view.
Figure 2:
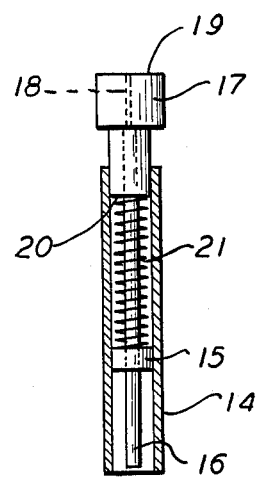
FIG. 2 is a partial, sectional, side elevational view of the tube assembly.
Figure 3:
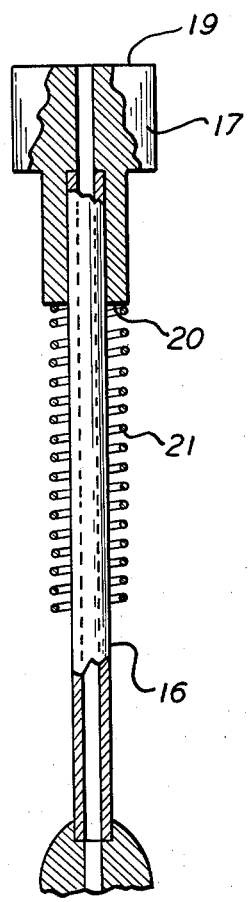
FIG. 3 is a partial sectional view of the conduit and spring.

Referring now to the drawings in detail, the contact lens applicator provides a cup 11 with a normally oval opening which is made of a transparent, resilient plastic material such as polyurethane. Being resilient, it is compressed and applied to the eyelid of the eye, and also to the skin below the eye. The normal opening of the eye cup is slightly larger than a widely open eye. Upon being released, the cup 11 resumes its normal shape and opens the eye wide by raising the lid, and also pushing down the skin below the eye. Being transparent, it enables the user to look through the cup at a mirror and direct a contact lens to proper seating on the eyeball.

The cup 11 is provided with a rim 12 which embraces its edge. The rim 12 is made of rubber or other soft material to prevent bruising or abrasion of the skin of the user by the bare plastic edge of the cup 11. The cup 11 is provided with a generally central bottom tubular enlargement 13 that defines a passage for a tube 14 to enter the cup 11. The tube 14 is slidable in the enlargement 13. An annular seat 15 for a spring is attached inside the tube 14. A conduit 16 which is tubular is slidably mounted in the annular seat. The top of the conduit 16 has an enlargement 17 which defines a lens seat 19 with a passage 18 communicating with the conduit 16. The bottom of the conduit 16 is dimensioned to receive the dispensing tip of a bottle of contact lens eye solution, which will pass through the conduit 16, and through the passage 18 in the enlargement 17 to wet the lens seat 19. The bottom of the enlargement 17 has a shoulder 20 which is engaged by a light spring 21, which is also engaged by annular seat 15. This spring 21 exerts light pressure on the lens seat 19 so that impingement with the contact lens and the eye will be delicate enough to insure against injury.

The cup 11 is also provided with an irrigation passage 22, so that it can be used to introduce an eye irrigation solution to bathe the entire eyeball.

In use, the walls of the cup 11 are squeezed to bring the outer edges close together. Then these edges are applied gently to the eyelid and to the flesh beneath the eye; the compression exerted on the cup 11 is relieved and the cup 11, being resilient, resumes its cup shape and the eye is widely exposed for the application of the contact lens.

Figure 4:
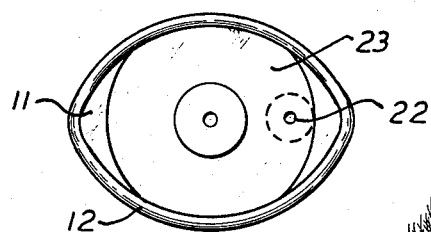
FIG. 4 is a top plan view of the cup in normal state.
Figure 5:
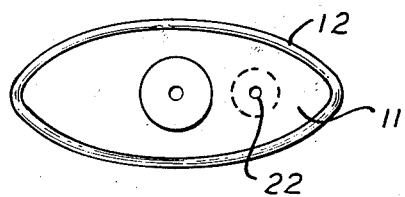
FIG. 5 is a top plan view of the cup compressed.
Figure 6:
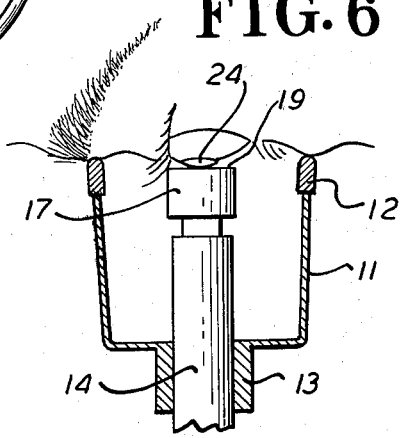
FIG. 6 is a partial, sectional, elevational view showing the cup applied to the user's eye.

The tube 14 has been adjusted to position the seat sufficiently high in the cup 11 so that a lens on the seat 19 will be placed against the eye. The seat 19 is spring-loaded lightly, so that the enlargement 17 will yield to the eye, avoiding abrasion. The contact lens solution passes from the bottle 23 through the conduit 16 to the seat 19. The contact lens 24 is wetted in the seat 19 and is ready for application to the eye as shown in FIG. 6. The cup 11, by being compressed (as in FIG. 5) and released (as in FIG. 4) has exposed the eyeball. The user may sight through the transparent cup 11 at a mirror, to aim the seat 19 to accurately direct the lens to the eye.

What is claimed:

1. A contact lens applicator:
   a. a resilient, transparent, compressible cup with a normally oval opening having a general dimension larger than a widely open eye,
   b. a generally central tubular enlargement in the bottom of the cup,
   c. a tube frictionally seated in the tubular enlargement and extending at one end into the cup, and at the other end outside the cup,
   d. a tubular conduit in the tube,
   e. a seat for a contact lens in the cup and attached to the top of the conduit,
   f. an annular seat in the tube,
   g. a light spring in the tube engaged with the seat for the contact lens and with the annular seat, whereby the contact lens seat is yieldable to light contact with the eyeball.

2. The device according to claim 1 and a. a passage in the seat for the contact lens communicating with the tubular conduit, whereby contact lens fluid applied to the bottom of the conduit may flow through it onto the seat for the contact lens.
3. The device according to claim 2 and
a. a passage in the cup for the introduction of an eye irrigating fluid.
4. The device according to claim 1 and
a. a passage in the cup for the introduction of an eye irrigating fluid.
5. The device according to claim 1 and
a. a rim of soft material attached to the edge of the cup.
6. The device according to claim 1 and
a. the tube frictionally seated in the tubular enlargement, adjustable to bring the position of the contact lens seat in the cup from a position further away, to a position close to the cup edge of the cup.
7. A contact lens applicator comprising:
a. a resilient, transparent, compressible cup with a normally oval opening having a general dimension larger than a widely open eye,
b. a generally central tubular enlargement in the bottom of the cup,
c. a tube frictionally seated in the tubular enlargement and extending at one end into the cup, and at the other end outside the cup,
d. a tubular conduit in the tube,
e. a seat for a contact lens in the cup and attached to the top of the tube,
f. an annular seat in the conduit,
g. a light spring in the tube engaged with the seat for the contact lens and with the annular seat, whereby the contact lens seat is yieldable to light contact with the eyeball,
h. a passage in the seat for the contact lens communicating with the tubular conduit, whereby contact lens fluid applied to the bottom of the conduit may flow through it onto the seat for the contact lens,
i. a passage in the cup for the introduction of an eye irrigating fluid,
j. a rim of soft material attached to the edge of the cup,
k. the tube frictionally seated in the tubular enlargement, adjustable to bring the position of the contact lens seat in the cup from a position further away, to a position close to the cup edge of the cup.

* * * * *